Sept. 11, 1962     I. R. SHELDON     3,053,426
FILM SYNCHRONIZER

Filed May 2, 1960     2 Sheets-Sheet 1

INVENTOR.
IRWIN R. SHELDON
BY
ATTORNEY

Sept. 11, 1962     I. R. SHELDON     3,053,426
FILM SYNCHRONIZER

Filed May 2, 1960                        2 Sheets-Sheet 2

INVENTOR.
IRWIN R. SHELDON
BY
ATTORNEYS

United States Patent Office 3,053,426
Patented Sept. 11, 1962

3,053,426
FILM SYNCHRONIZER
Irwin R. Sheldon, Brooklyn, N.Y., assignor to Precision Cine Equipment Corporation, Brooklyn, N.Y., a corporation of New York
Filed May 2, 1960, Ser. No. 25,957
7 Claims. (Cl. 226—76)

This invention relates to an improved motion picture film synchronizer for use by the motion picture and television industries to edit optical or magnetic film.

Devices of the indicated type are employed to measure the footage of a film, to synchronize a picture film with a sound film, to edit a film or films, and the like. These devices may be and are constructed to be used in practicing more than one of such modes of operation. As heretofore constructed, these devices are composed of an integral base or block provided with end bearings for rotatably supporting a central shaft on which is mounted between such bearings one or more film sprockets depending upon the particular operation the device has been designed to perform. The film or films connected to the sprocket or sprockets of the device are drawn through the device by the usual rewind mechanism which through the film rotates the sprocket or sprockets and consequently the central shaft of the device. The shaft at its front end projects beyond the front end bearing and is provided on such projecting end with a hand knob that is manually turned in one direction or the other to effect proper attachment of a film to a sprocket in setting up the device for an operation. Mounted on the base adjacent to such projecting end of the shaft and connected to the latter is a counter for registering in footage of film or number of frames the revolutions of the shaft. If the device is to be utilized solely as a means for measuring the footage or counting the frames of a film it may be provided with one film sprocket for feeding the film therethrough as the knob and the shaft are manually rotated. If the device is to be used as a means for synchronizing an optical or picture film with a magnetic sound film, it may be provided with a sprocket for the sound film and a sprocket for the picture film, the former of which is provided with a suitable magnetic head attachment to read back to the operator the sound recording on the film as it is being advanced by the manual turning of the knob. The device may also be utilized to edit or compare one or more films with a film of known footage to determine if the films being checked have been changed in any respects from the known film. To accomplish this, as many additional film feeding sprockets are mounted on the shaft as are required to take care of the number of films to be checked in one operation. As above, indicated, each of these prior devices were especially constructed as a complete device for whatever operation it was intended to perform. Accordingly, when the operator desired to perform a different operation it was necessary for him to use a different device which was especially constructed to perform such different operation. This necessitated that the operator have on hand as many of these prior devices as there are types of operations that he performed in the carrying out of his business. This situation also necessitated that the supplied of these devices keep in stock a complete line of such devices to take care of all of the types of operations for which his customers might have occasion to use the devices.

The primary purpose of the present invention is to provide a device of the type indicated which is of such universal nature that it can be readily adapted to carry out any of the types of operations for which such a device may be usefully employed.

A further object of the invention is to provide a universal device of the types indicated and which is of such unitized construction, that the user is enabled to readily build a device suitable for his particular needs starting with a basic device having but one film feeding sprocket.

Other objects of the invention as well as the features of construction thereof will appear from the following description when read in connection with the following drawings, in which—

FIG. 4 is a plan view of the shaft in the assembly of FIGS. 2 and 3;

FIG. 5 is an end view of the shaft shown in FIG. 4; and

Figures 2, 3:
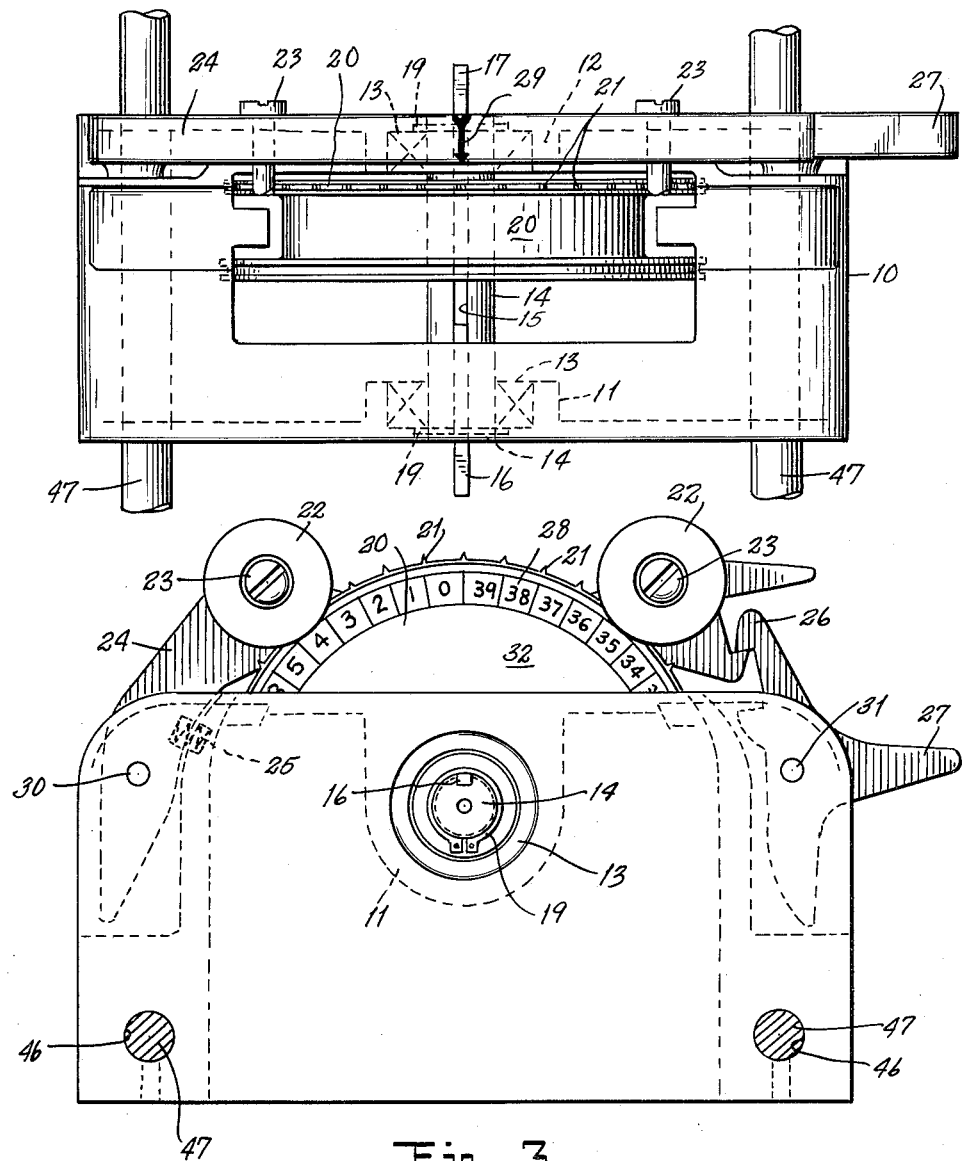
FIG. 2 is a top plan view of one of the sprocket assemblies shown in the device of FIG. 1, the assembly being shown without the associated guide rollers for the sake of clearness.
FIG. 3 is a front elevational view of the sprocket assembly shown in FIG. 2 and with the guide rollers included.

FIGS. 6 and 7 are plan and end views similar to FIGS. 4 and 5, respectively, of a modified form of shaft for the sprocket assembly of FIGS. 2 and 3.

Figure 1:
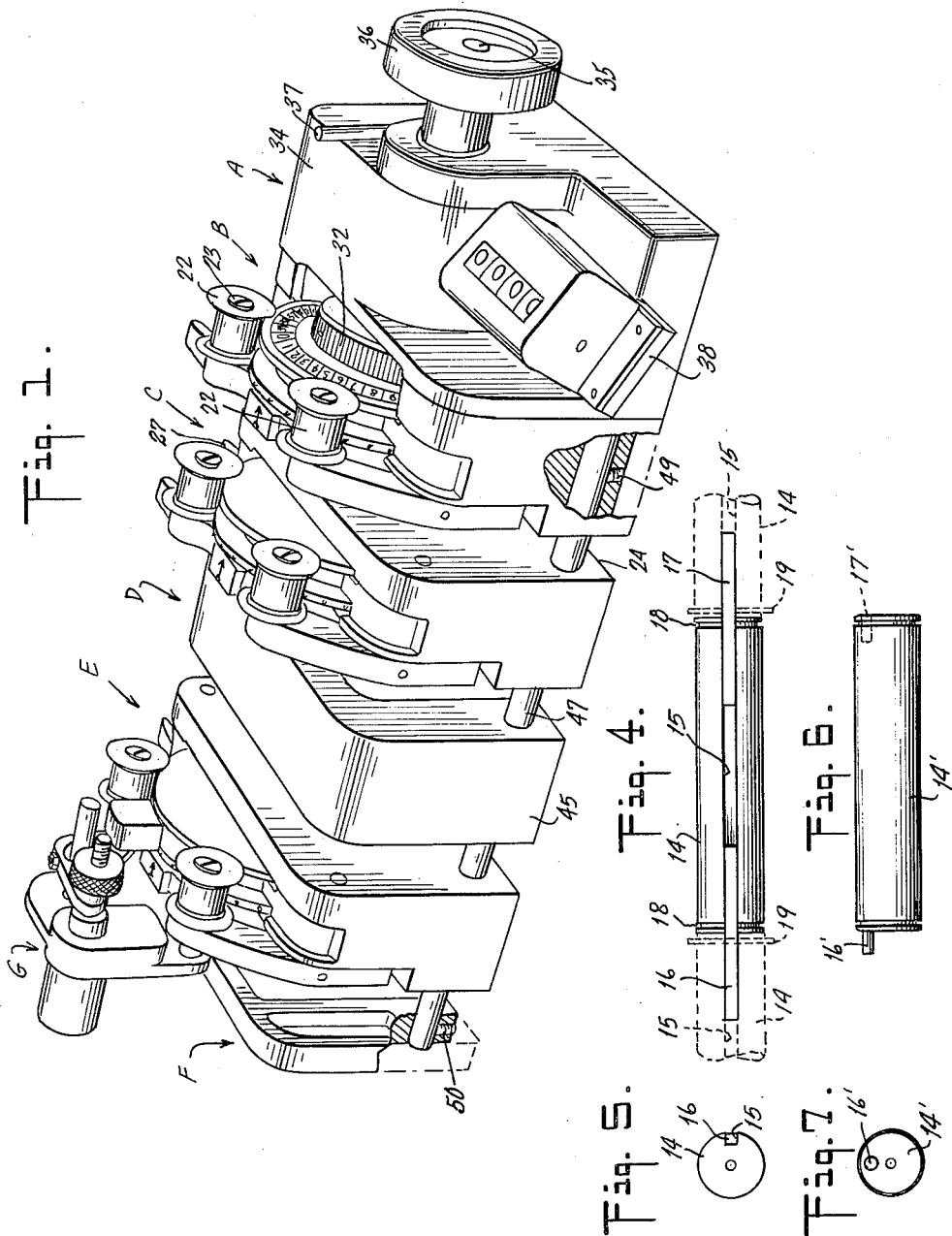
FIG. 1 is an exploded, perspective view of a device embodying the invention and indicating a possible form thereof for use in a particular operation.

The motion picture film synchronizer shown in FIG. 1 of the drawings is composed of a plurality of separately constructed, individual units A, B, C, D, E and F. Units C, D, E and F are shown in spaced relation for the purpose of indicating more clearly the unitized construction of the device, but when the device is properly assembled for operation such units will be closed together so that they engage with one another in the manner of units A and B. Units A and B together form what may be termed the basic device which itself is useful for the measurement of the footage of a picture or sound film, or to count the number of frames in a picture film. The unit B of the basic device is a sprocket assembly which, as is shown more clearly in FIGS. 2 and 3 of the drawings, is composed of a cast base 10 having integrally formed therein spaced front and rear end bearing supports 11 and 12, respectfully, each adapted to receive a ball bearing unit 13 for rotatably supporting a short shaft 14. The shaft 14 has a length substantially equal to the width of the base 10 of unit B so that its ends are substantially flush with the front and rear faces of such unit. Extending throughout the entire length of the shaft 14 is a rectangularly-shaped longitudinally extending groove 15 forming in the surface of the shaft a keyway for keys 16 and 17 to couple the ends of such shaft to similar aligned shafts provided in adjoining units A and C. As is shown more clearly in FIGS. 4 and 5 of the drawings, each key 16 and 17 is substantially shorter in length than shaft 14 and is square or rectangularly-shaped in cross-section. When coupling shaft 14 to the aligned shafts of units A and C as indicated in dotted outline in FIG. 4, the keys or pins 16 and 17 are only partially supported in the end portions of the keyway 15 and project beyond the ends of shaft 14 and into the opposed end portions of similar keyways provided in such aligned shafts. Provided on the end portions of shaft 14, as well as on the opposed end portions of said aligned shafts, are grooves 18 for receiving split rings 19 to retain the keys in proper positions in the aligned portions of the keyways and to maintain the shaft in its proper position in the unit and relative to the bearings 13 therefore, compare FIGS. 1–3 and the dotted line showing in FIG. 4 to which similar reference numerals have been applied to corresponding parts. The rings 19 are received in recesses provided in the front and rear surfaces of the base 10 and thereby do not project beyond such surfaces or effect the close assemblage of the several units. The retaining rings 19 are preferably made of spring metal and of the configuration shown in FIG. 3 of the drawings. Thus, the keys or pins 16 and 17 are enabled to connect and lock shaft 14 in perfect alignment with the shafts of the adjoining units A and C.

The shaft 14 has secured thereto as by a set screw a film sprocket 20 provided on its rear rim with pins 21 which progressively enter the row of aligned apertures provided along one edge of the film to advance the film as the shaft is rotated. The edges of the film are maintained in engagement with the rims of the sprocket 20 by a pair of guide rollers 22 mounted for free rotational movement on forwardly extending pins 23 provided in spaced relation on an arm 24 so that such rollers are located on opposite sides of shaft 14 with their rotational axes in parallelism with the longitudinal axis of such shaft. One end of the arm 24 is pivotally mounted at 30 in FIG. 3 on the base 10 and is normally biased to a raised position in which the rollers 22 are removed from the sprocket to permit the connection of a film to the latter, by a coiled spring 25 located between such arm and the base 10 adjacently above the pivot point 30 thereof. The arm 24 is maintained in lowered position against the pressure of such spring with the guide rollers 22 in proper relation to the sprocket 20 for holding the film, by a hook-shaped latch 26 pivotally mounted at 31 in FIG. 3 on the base 10 so as to engage and hold the other end of the arm 24. The latch 26 is provided with a finger piece 27 which may be depressed to release arm 24 from its latched condition. Positioned against the forward face of sprocket 20 is a scale 28 indicating the number of frames of the film that will be advanced in one rotation of shaft 14 and sprocket 20. Scale 28 is fastened to a knurled ring 32 forming part of an indexing mechanism of a type known to the art for adjusting the frames. Provided on the top of arm 24 between the guide rollers 22 is an indicating arrow 29 located to the rear of the sprocket 20 and in the same vertical plane as the rotational axis of shaft 14 and pointing forwardly to such sprocket. The arrow 29 forms an index for the scale 28 and also as a means for indicating the manner in which the unit B should be assembled with unit A.

The unit A is also composed of a cast metal base 34 formed to rotatably support in a manner similar to base 10 of unit B a short shaft 35 that is provided with a keyway enabling it to be locked in alignment with shaft 14 in the manner previously explained. The shaft 35 is provided on its forward projecting end with a knob 36 which when manually turned by the operator causes simultaneous rotational movement of the aligned interlocked shafts 35 and 14 of units A and B, respectively. Pivotally mounted on the forward end of base 34 is a lever 37 adapted to be manually manipulated to cause a locking means to lock shaft 35 and consequently shaft 14 in position, or to release such shafts for rotational movement. Also mounted on base 34 is a counter 38 suitably connected to shaft 35 in a known manner by gearing housed within such base and constructed to enable the counter to record footage or frames of a film in a manner known to the art.

It will be understood from the foregoing that when interlocked shafts 35 and 14 are free to turn, the operator by manipulating knob 36 turns the sprocket 20 until the arrow 29 registers with the desired unit on scale 28 representing the frame of the film that will be attached to the sprocket at that point. The lever 37 is then actuated to lock the shafts and the sprocket 20 so as to maintain the registered position. With the arm 24 released, so that the guide rollers 22 are raised, the operator then properly threads the film onto the pins 21 of the sprocket. When this has been done, the arm 24 is depressed against the pressure of its associated spring and locked in depressed position by the latch 26. The lever 37 is again actuated to release the shafts 14 and 35 and the film is advanced through the device by turning the knob 35. As the film feeds through the device, the counter operates to count either the footage thereof or the number of frames thereof.

Unit C is a sprocket assembly that is substantially similar in construction to sprocket assembly unit B and is coupled in driven relation to the latter in the manner above described. Sprocket unit C differs from unit B principally in the respect that it is not provided with a frame scale and accordingly the base thereof is not formed to accommodate the latter. Unit C may be utilized to check the number of frames or footage of a film which might possibly have been changed, against a known film being fed simultaneously through unit B. To facilitate the checking of a number of films that might need the same, several additional units of the type of unit C may be coupled to the latter in the manner above described. Thus for example, by adding two more of such units in tandem to unit C and connecting the shafts together in the manner aforesaid, three films may be checked at the same time against the film being fed through unit B.

Unit D is a spacer unit that consists of a base 45 provided with bearing supports, bearings and a shaft substantially similar in construction to the comparable parts described in connection with unit B and the shaft thereof is locked in aligned relation with the shafts of units A, B and C in the manner described with respect to shaft 14 of unit B.

Unit E is substantially similar in construction to the sprocket assembly unit C and differs from the latter principally in that it has been provided with a magnetic sound playback head G of a construction usually employed in this type of device. Thus, a sound film may be fed through unit E and as it is fed therethrough, the sound will be read back to the operator so that he can check the picture film against the sound film and make any corrections that are necessary. It is of course apparent at this time that the shaft of unit E will be locked in alignment with the shafts of the other units in the manner described with respect to shaft 14 so that as the hand knob 36 is turned all of the shafts will rotate as a unit.

The rear end bell F is a casting that merely completes the device at its rear end and forms a guard for the pivotal guide roller supporting arm of unit E.

It will be noted from FIG. 1 of the drawings that each of units B, C and E are provided with an indicator arrow 29 to indicate the proper arrangement of such units in the assembly thereof. It is immaterial in which of the two possible positions the spacer D may be placed because of its symmetric construction, while it is quite apparent from the construction of units A and E what their positions should be in the assembly. It is preferred that the bases 34 and 10 of units A and B, respectively, shall be initially secured together in any suitable fashion, as by screws. To facilitate the assembly of the remaining units to the connected units A and B, each of units C, D, E and F are provided with two spaced openings 46 in FIG. 3 extending therethrough at the bottom thereof and in alignment with similar openings formed in unit B. The openings 46 conform in size and configuration to the external surfaces of two assembly rods 47 which extend therethrough. In assembling the device, the rods are first inserted into the openings 46 in unit B of the basic device and the portions thereof located in such openings are secured in position therein by set screws 49 (note FIG. 1). Each of units C, D and E is then successively slipped onto the rods, advanced to a position at which the shaft thereof may be coupled to the previous unit, and then pushed up against the latter. The rear unit F is then slipped onto the rods 47 to complete the device. Rear unit F is also secured to the rods 47 by set screws 50 as indicated in FIG. 1. Thus the rods 47 not only serve as a means for assembling the units together, but together with the set screws 49 and 50, also cause the device to become in effect an integral device and enable it to be handled as a complete device. The rods 47 perform a further function in that they form with the coupled shafts a triangulation of connected points between the units that assure perfect alignment of such units in their coupled condition.

It will be evident from the foregoing that many variations in the arrangement of the units may be made. The sprockets may be of different sizes to take care of 70 mm., 35 mm., 17.5 mm., 16 mm. and 8 mm. size films. The units A and B constituting the basic device may be constructed as one individual unit with one common shaft instead of the two above described separate shafts 35 and 14, respectively. In such event, the bearings for such common shaft will be provided on the front of unit A and at the rear of unit B. Combination synchronizers may also be assembled with sprocket assemblies for two sizes of film, for example, 16 and 35 mm. sprocket units may be assembled in the same device to match frame for frame in the two sizes of film. In such a device, there may be provided a unit similar to the above described unit B for each of the two sizes of film and a gear ratio unit essentially similar to above described unit A complete with counter for each of the two sizes of film. In such an assembly the above described rear end unit F is preferably eliminated and one of the gear ratio units placed at the rear of the device. To facilitate reading of the counters, the counter on the rear unit should face in the same direction as the counter on the front unit. It is also possible to use a different method of locking the shafts in alignment then by the above described preferred key arrangement. Thus as shown in FIGS. 6 and 7 of the drawings, one end of each shaft 14′ may be provided with a projecting pin 16′ adapted to be receivable in a similarly shaped recess 17′ provided on the other opposed end of an adjacent shaft. It will be evident to those skilled in the art that still further changes may be made in the units and the assembly thereof without departing from the spirit of the invention or the scope of the appended claims.

I claim:

1. A motion picture film synchronizer composed of a plurality of separate individual units arranged in side-by-side relation with the opposed side faces of adjacent units in substantial engagement with each other, at least one of said units containing elements forming a complete sprocket assembly for feeding a film and at least one of said units constituting the actuating means for said sprocket unit and embodying elements operable to turn the film feeding elements of said sprocket unit to feed the film, each of said individual units comprising a short shaft extending transversely thereof and disposed in axial alignment with the shafts of the other units, each shaft end that is in opposed relation to the end of a shaft in an adjacent unit extending no further than the associated side face of its unit to enable the latter to come into substantial engagement with the opposed side face of said adjacent unit, means in each of said individual units for rotatably supporting said shaft thereof, said shaft supporting means in a sprocket unit comprising end bearings mounted in fixed spaced relation on said sprocket unit, the film feeding sprocket of said unit being mounted on its associated shaft intermediate said end bearings, and means for maintaining said associated sprocket shaft in rotatably supported relation between the side faces of such sprocket unit, means extending across the opposed side faces and adjacent of said individual units for interlocking the opposed ends of adjacent shafts to each other in axially aligned relation to form a continuous composite shaft throughout the length of the synchronizer, and means for holding said separate individual units together in assembled relation in the synchronizer.

2. A motion picture film synchronizer such as defined in claim 1 in which the shaft of said actuating unit is coupled to the shaft of said sprocket assembly unit so that said units form a basic device to which other units may be detachably coupled.

3. A motion picture film synchronizer such as defined in claim 1, in which said interlocking means includes a locking element provided on the shaft of said sprocket assembly unit and projecting from one end of said shaft and adapted to be engaged with locking means provided on the opposed end of the shaft of an adjacent unit, the other end of said sprocket assembly unit shaft being provided with locking means to engage with a locking element projecting from the opposed end of the shaft of a second adjacent unit.

4. A motion picture film synchronizer such as defined in claim 3, in which said locking means on said sprocket assembly unit shaft comprises a keyway extending lengthwise of said shaft, and in which said locking elements constitute keys detachably mounted in said keyway.

5. A motion picture film synchronizer such as defined in claim 4, including a split retaining ring mounted in each of two annular grooves provided on the shaft of said sprocket assembly unit adjacent to each end of such shaft, said rings retaining said keys in the end portions of said keyway and maintaining said shaft in proper position on said unit.

6. A motion picture film synchronizer such as defined in claim 1 in which said holding means includes a plurality of assembly rods extending through apertures in said aligned units, said units being slidably moved on said rods to guide them into proper assembled relation.

7. A motion picture film synchronizer such as defined in claim 6, including a single base for supporting all of said units, connecting elements provided on the two end units of the film synchronizer, and fastening elements securing said connecting elements to said single base.

References Cited in the file of this patent

UNITED STATES PATENTS

| 1,974,758 | Spray | Sept. 25, 1934 |
| 2,055,124 | Farrand | Sept. 22, 1936 |
| 2,431,130 | Luchansky | Nov. 18, 1947 |
| 2,865,632 | Vogel et al. | Dec. 23, 1958 |

UNITED STATES PATENT OFFICE
CERTIFICATE OF CORRECTION

Patent No. 3,053,426                                  September 11, 1962

Irwin R. Sheldon

It is hereby certified that error appears in the above numbered patent requiring correction and that the said Letters Patent should read as corrected below.

Column 6, line 6, for "and" read -- of --.

Signed and sealed this 15th day of January 1963.

(SEAL)
Attest:

ERNEST W. SWIDER
Attesting Officer

DAVID L. LADD
Commissioner of Patents